(12) United States Patent
Nikolic

(10) Patent No.: US 9,829,267 B1
(45) Date of Patent: Nov. 28, 2017

(54) SCUBA DIVING ACCESSORY, MONOPOD, SLING, FISHING SPEAR, BUOYANCY STICK, LOBSTER TICKLING ROD, EEL RATTLE, SIGNALING DEVICE FOR OTHER DIVERS

(71) Applicant: Dragan Nikolic, Holiday, FL (US)

(72) Inventor: Dragan Nikolic, Holiday, FL (US)

( * ) Notice: Subject to any disclaimer, the term of this patent is extended or adjusted under 35 U.S.C. 154(b) by 0 days.

(21) Appl. No.: 15/492,284

(22) Filed: Apr. 20, 2017

(51) Int. Cl.
*A01K 81/06* (2006.01)
*F41B 3/02* (2006.01)
*F41B 7/04* (2006.01)
*B63C 11/02* (2006.01)
*A01K 81/04* (2006.01)
*A01K 81/00* (2006.01)

(52) U.S. Cl.
CPC .............. *F41B 3/02* (2013.01); *A01K 81/00* (2013.01); *A01K 81/04* (2013.01); *A01K 81/06* (2013.01); *B63C 11/02* (2013.01); *F41B 7/04* (2013.01)

(58) Field of Classification Search
CPC ........ A01K 81/00; A01K 81/04; A01K 81/06; F41B 3/02; F41B 7/04
USPC ........................... 124/17, 20.1, 20.3, 22; 43/6
See application file for complete search history.

(56) References Cited

U.S. PATENT DOCUMENTS

| | | | | |
|---|---|---|---|---|
| 2,522,060 A * | 9/1950 | Ridland | ................. | A01K 81/00 124/22 |
| 3,154,063 A * | 10/1964 | White | ................. | F41B 3/02 124/20.2 |
| 4,014,125 A * | 3/1977 | Baldi | ................. | A01K 81/00 124/22 |
| 4,027,418 A * | 6/1977 | Baldi | ................. | A01K 81/00 43/6 |
| 4,318,389 A * | 3/1982 | Kiss, Jr. | ................. | F41B 7/04 124/22 |
| 4,720,933 A * | 1/1988 | Stude | ................. | A01K 81/00 29/460 |
| 4,852,543 A * | 8/1989 | Mosser | ................. | A63B 53/00 124/17 |
| 5,125,388 A * | 6/1992 | Nicely | ................. | F41B 3/02 124/20.1 |
| 5,524,603 A * | 6/1996 | Menzer | ................. | F41B 7/04 124/20.3 |
| 5,887,577 A * | 3/1999 | Sherrill | ................. | F41B 3/02 124/20.1 |
| 5,904,132 A | 5/1999 | Biller | | |
| 8,496,017 B2 * | 7/2013 | Haddad | ................. | A45B 3/00 135/66 |
| 8,677,675 B2 * | 3/2014 | Koch | ................. | A01K 81/04 294/126 |
| 8,887,434 B2 * | 11/2014 | Waugh | ................. | A01K 77/00 43/6 |
| 9,220,246 B1 * | 12/2015 | Roman | ................. | A01K 81/04 |
| 9,441,906 B2 * | 9/2016 | James | ................. | A01K 81/06 |

(Continued)

*Primary Examiner* — Alexander Niconovich

(57) ABSTRACT

A diving accessory is disclosed. The invention is comprised of a compact, lightweight fishing spear having two parts: a hollow main tube and a barbed spear. Said spear can be stowed inside the tube and the entire apparatus clipped to a diver when not in use. The invention can also be used as a poking stick (for self defense against large sea creatures), a tickling stick (for prodding prey out of small spaces), and as a camera monopole (by using the onboard shoe mount). An objective of the invention is to provide a compact, spearfishing device with multiple functions to enhance the diving experience.

5 Claims, 6 Drawing Sheets

(56) References Cited

U.S. PATENT DOCUMENTS

| | | | |
|---|---|---|---|
| 2001/0032409 A1* | 10/2001 | Nicolai | A01K 81/00 43/6 |
| 2002/0116768 A1* | 8/2002 | Grassi | A45B 3/00 7/158 |
| 2012/0085330 A1* | 4/2012 | Hickerson | A01K 81/04 124/22 |
| 2012/0246995 A1* | 10/2012 | Moore, Jr. | A01K 81/04 43/6 |
| 2015/0136103 A1* | 5/2015 | Thornbrough | A01K 81/06 124/22 |
| 2015/0204633 A1* | 7/2015 | Nelson | F41B 7/04 124/22 |
| 2016/0061552 A1* | 3/2016 | Nicely | A01K 81/00 124/22 |
| 2017/0122559 A1* | 5/2017 | Wick | F23Q 13/005 |

* cited by examiner

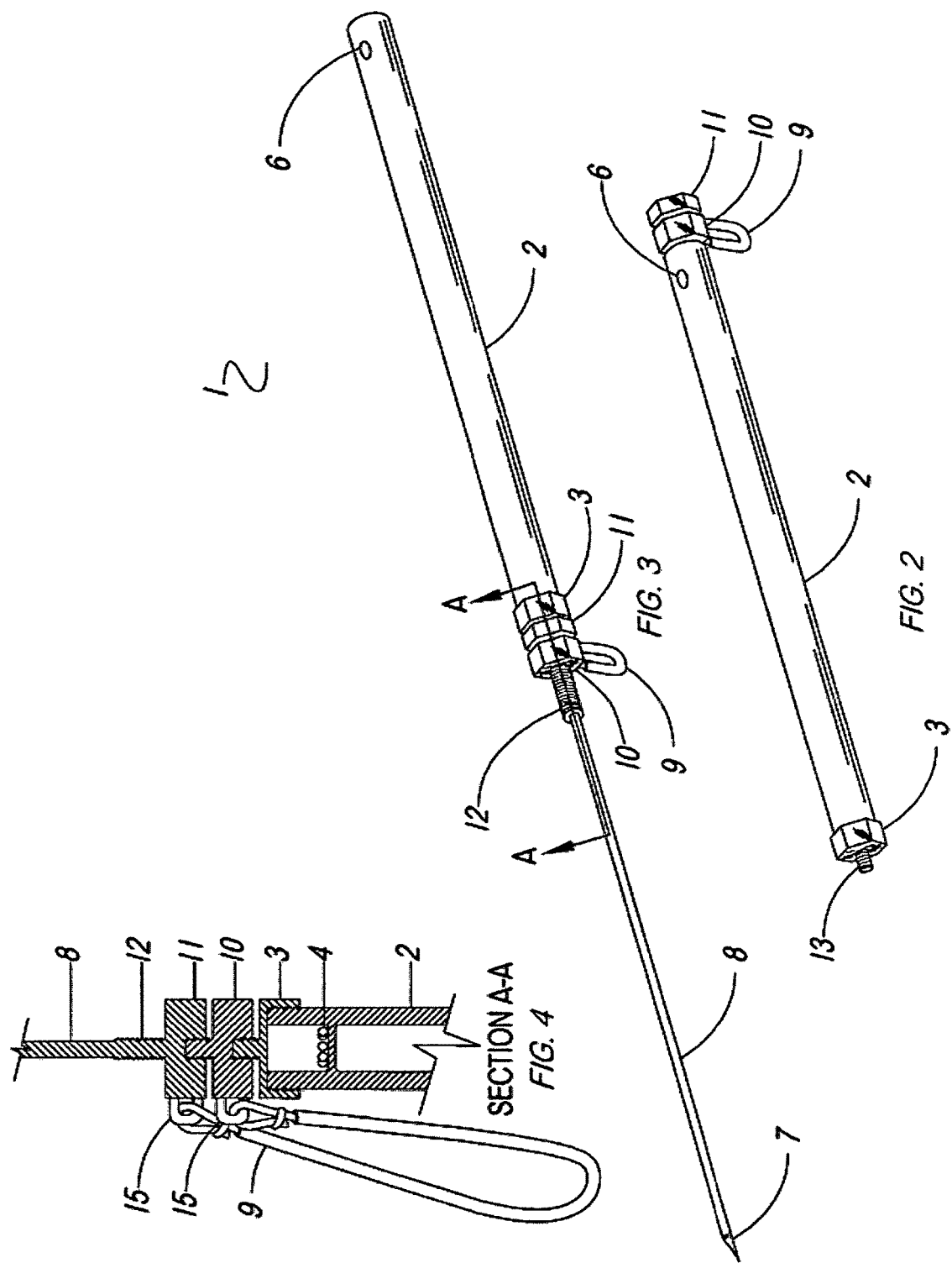

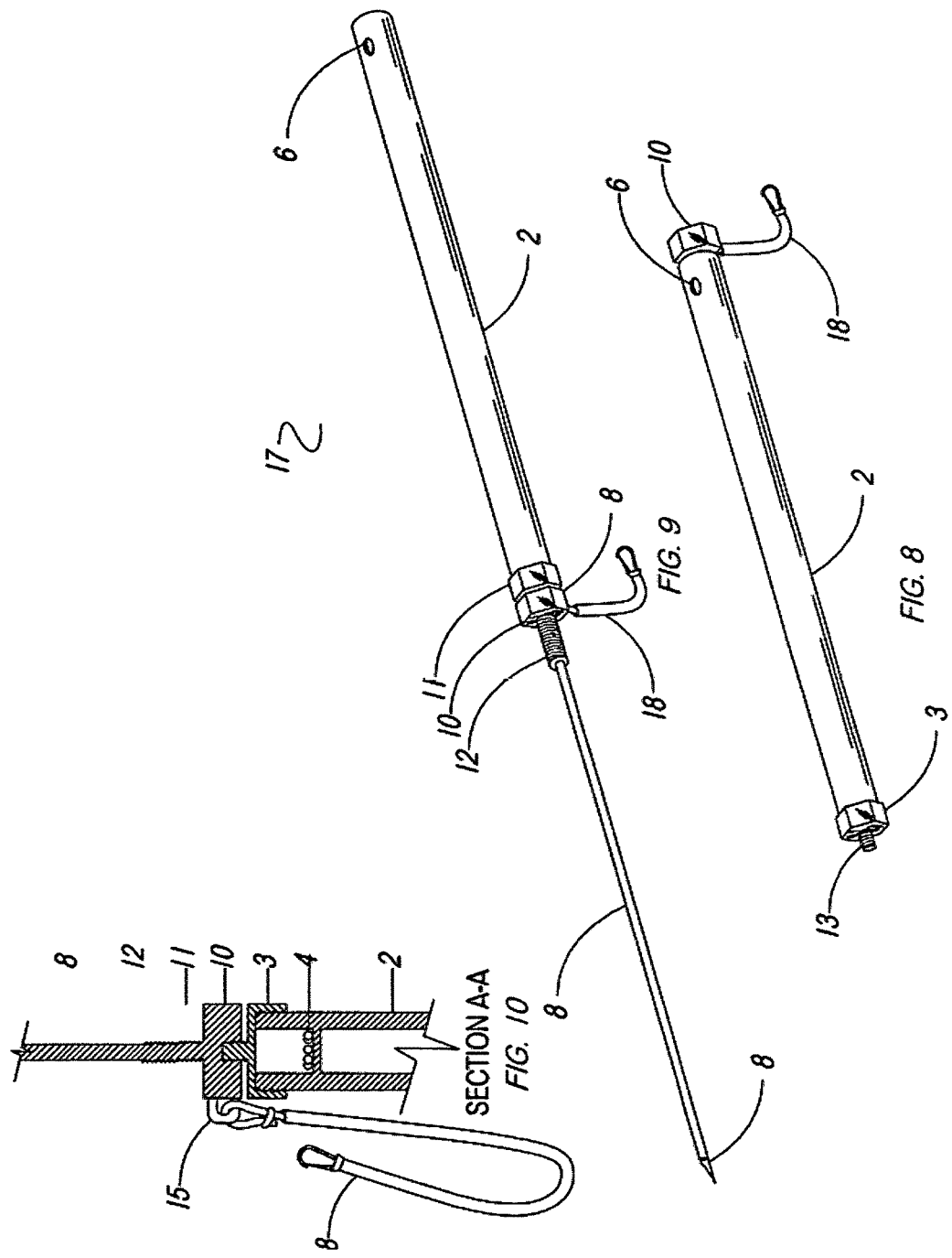

SCUBA DIVING ACCESSORY, MONOPOD, SLING, FISHING SPEAR, BUOYANCY STICK, LOBSTER TICKLING ROD, EEL RATTLE, SIGNALING DEVICE FOR OTHER DIVERS

FIELD OF THE INVENTION

The present invention generally relates to diving accessories. More specifically, this invention relates to spear fishing apparatuses having a plurality of functions therein.

BACKGROUND

Spearfishing is an ancient method of hunting that has been used throughout the world for many thousands of years. Early humans began spearing fish from rivers and streams using sharpened sticks.

With the advent of scuba diving in the 20th century, spear fishing enthusiasts began spending more time underwater. Today, the sport of modern spearfishing uses more elaborate spear and sling systems and the industry continues to improve upon this ancient tool. U.S. Pat. No. 5,904,132A granted to Biller disclosed an ergonomic spear fishing sling with a contoured grip that allows for more endurance. U.S. Patent No. 20120246995A1 granted to Moore disclosed a handheld, retractable knife spear. U.S. Pat. No. 8,677,675B2 granted to Koch disclosed a multi-pronged spear fishing tip that allowed catches to be more securely retrieved. U.S. Patent No. 20150136103A1 disclosed to Thornbrough developed a spearfishing apparatus having a line reel to retrieve catches after spearing under water. While many of these improvements have made the sport of spearfishing more effective, many such devices can be large and bulky—little was found in the prior art that includes compact, multipurpose slings.

SUMMARY OF THE INVENTION

The device herein disclosed and described provides a solution to the shortcomings in the prior art through the disclosure of a diving accessory. An object of the aforementioned invention is to provide a multifunctional spear fishing sling that affords greater protection and streamlines the hunting process.

Another object of the aforementioned invention is to provide a compact spear fishing sling. The sling comes in two parts and the spear portion of the sling can be stowed inside the hollow main tube. A rubber sling connects the spear to the tube. When the spear is needed, it can be removed from the tube and inserted into a perpendicular hole on one end of the tube. When ready to hunt, a user can pull the spear back by means of a cap on one end while holding on to the main tube with the other hand. A user then draws tension on the cap for firing. After hunting, the spear can be stored inside the tube—the cap on one end of the spear is threaded and allows the spear to engage threads on the inside of the tube and holds it inside. The invention has an additional embodiment wherein the sling has a small carabiner clip that allows a diver to clip the device onto their vest.

Another object of the aforementioned invention is to provide a compact spear fishing sling having a mono pole camera mount. Another cap on the end of the main tube (opposite the spear cap when stowed) is threaded and will engage a camera hot shoe. Users can simply hold a camera in one end and screw the device into the camera using another hand. This novel feature allows divers to photograph restrictive or even dangerous subject matter from a slight distance.

Another object of the aforementioned invention is to provide a 'tickling rod' or 'poking stick.' The spear portion can also be screwed into the camera mount cap on the main tube and become a long, rigid rod to ward off aggressive sea life or prod prey out of restrictive areas.

Another object of the aforementioned invention is to provide a sounding device. Small ball bearings stored inside the camera mount cap can be shaken and make noise distracting aggressive sea life or in some cases even attract prey. The entire device itself can also be used to attract other divers when rapped against a scuba tank.

Another object of the aforementioned invention is to provide an additional means of buoyancy. The apparatus is slightly positively buoyant and can be advantageous when a diver carries heavy gear during a hunt. As buoyancy control device is used that you push yourself from ground, so you do not touch coral reef etc. . . . . .

as attractant for eels, as rattle in front of hole do eel don't get out and 'attack' rattle As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention. As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements.

The objects features, and advantages of the present invention, as well as the advantages thereof over existing prior art, which will become apparent from the description to follow, are accomplished by the improvements described in this specification and hereinafter described in the following detailed description which fully discloses the invention, but should not be considered as placing limitations thereon.

BRIEF DESCRIPTION OF THE FIGURES

The accompanying drawings, which are incorporated herein and form a part of the specification, illustrate some, but not the only or exclusive, examples of embodiments and/or features. It is intended that the embodiments and figures disclosed herein are to be considered illustrative rather than limiting. In the drawings:

FIG. 2 is a perspective view of one embodiment of the invention having parts assembled.

FIG. 3 is a perspective view of one embodiment of the invention having the spear attached to the main tube.

FIG. 4 is a section view of one embodiment of the invention's threaded caps.

FIG. 8 is a perspective view of another embodiment of the invention having parts assembled.

FIG. 9 is a perspective view of another embodiment having the spear attached to the main tube.

FIG. 10 is a section view of another embodiment of the invention's threaded caps.

Figure 1:
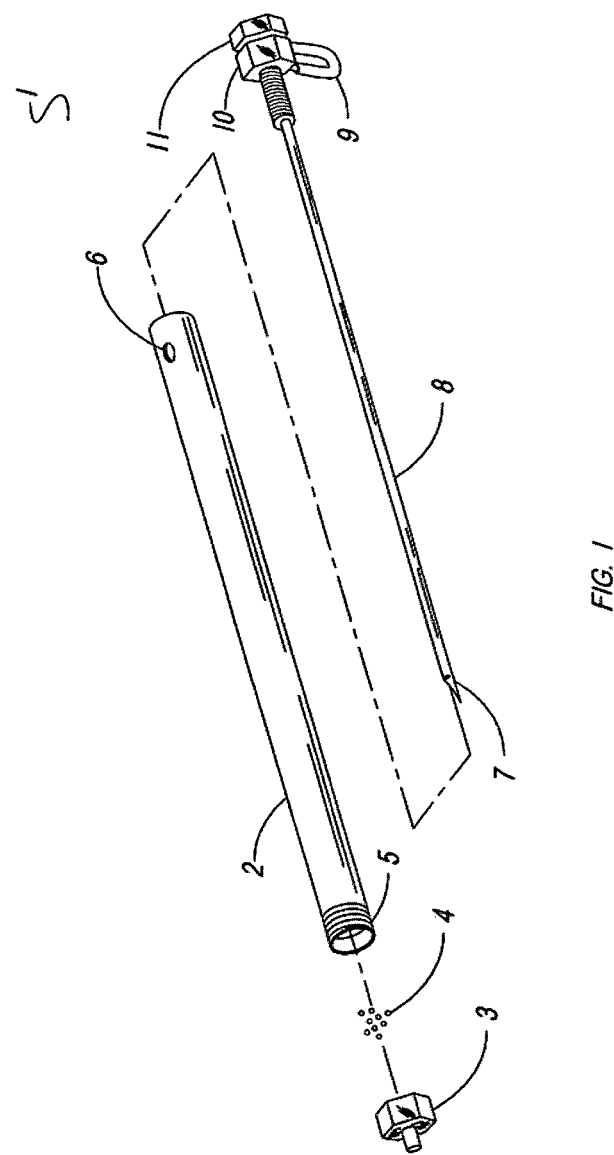
FIG. 1 is a perspective exploded view of one embodiment of the invention.

Other aspects of the present invention shall be more readily understood when considered in conjunction with the accompanying drawings, and the following detailed description, neither of which should be considered limiting.

DETAILED DESCRIPTION OF FIGURES

In this description, the directional prepositions of up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation.

FIG. 1 showing an embodiment of the current invention 1 being comprised of a hollow, main circular tube 2 made from a rigid materials such as plastic, aluminum, stainless steel and the like. Said tube 2 having one end with external threads 5 engaging internal threads in cap 3. Cap 3 having internal threads that engage tube 2 and being constructed of a rigid material such as plastic, aluminum, stainless steel and the like and having a hexagonal shape with another threaded protrusion on another side of said cap 3. A plurality of ball bearings 4 being sandwiched between cap 3 and a wall inside the end of tube 2 therein. A distal end of said tube 2 having an aperture 6 passing through the tube 2 on an axis perpendicular to said tube 2. An interior portion of distal end tube 2 having threads that engage another threaded sling cap 10 made of a rigid material such as plastic etc. Said cap 10 also being affixed to spear 8 by means of a cylindrical threaded protrusion thereon. Spear 8 being made of a rigid, corrosion resistant metal such as stainless steel etc. and having a barbed end 7 distal to said sling cap 10. Cap 10 also being of a hexagonal shape and having a flexible sling band 9 made of rubber etc. affixed to its outside member by means of a loop and ring fastener etc.

FIG. 2 illustrating an embodiment of the current invention 1 showing spear 8 stowed inside main tube 2 and being held therein by means of threaded sling cap 10.

FIG. 3 illustrating an embodiment of the current invention 1 showing spear 7 selectively connected to main tube 8 by means of caps 10 and 11 selectively and operatively connected to cap 11. Said caps 10 and 11 having similar hexagon shapes and constructed of a rigid material such as plastic and metal etc. and having both internal and external threaded members.

FIG. 4 illustrating a section view of threaded caps in an embodiment of the current invention 1. Anchor loop 15 allowing rubber sling 9 to be affixed indirectly to main tube 2.

Figures 5, 6:
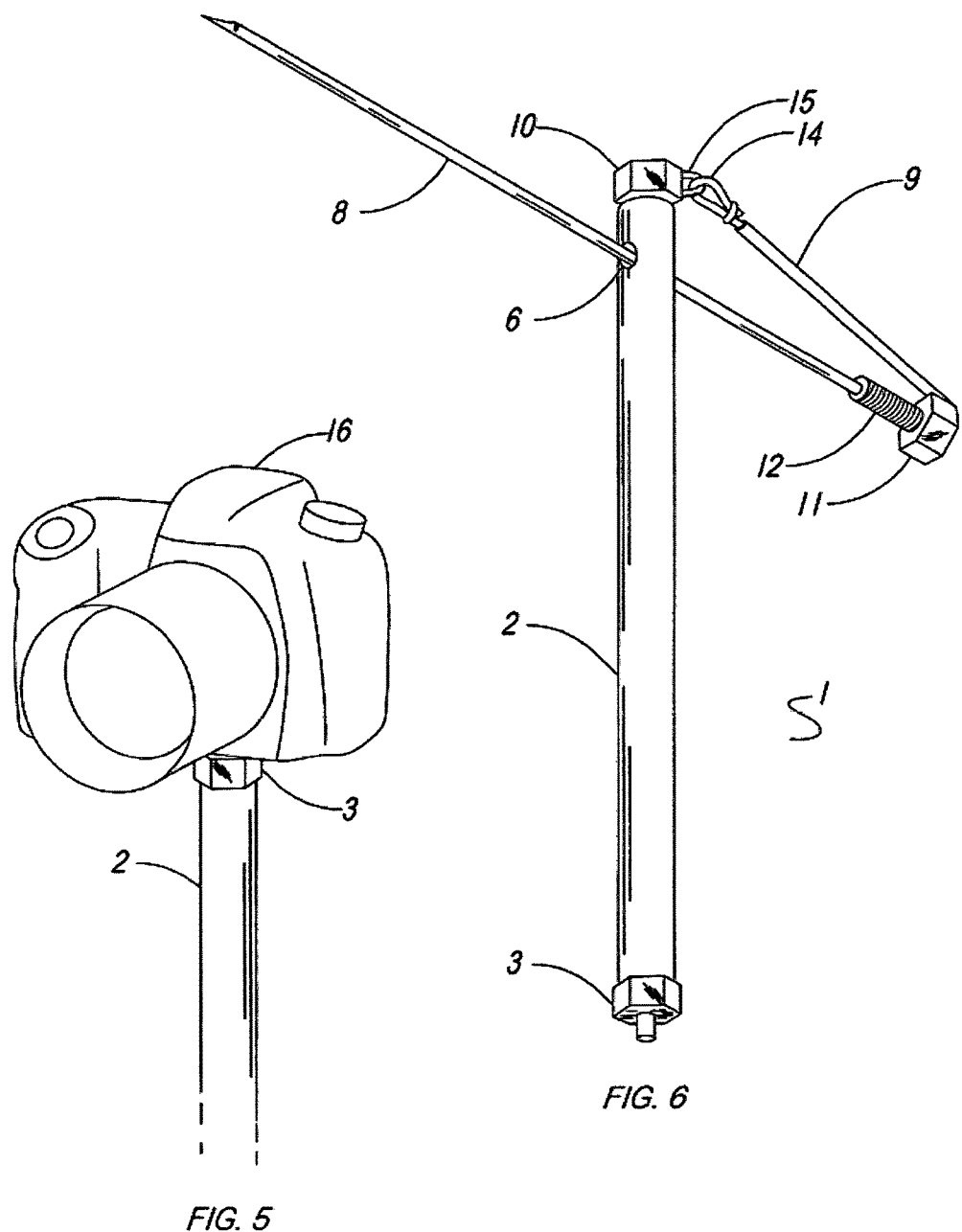
FIG. 5 is a perspective view of one embodiment of the invention having a camera affixed to the main tube.
FIG. 6 is a perspective view of one embodiment of the invention having the spear in firing position.
Figure 7:
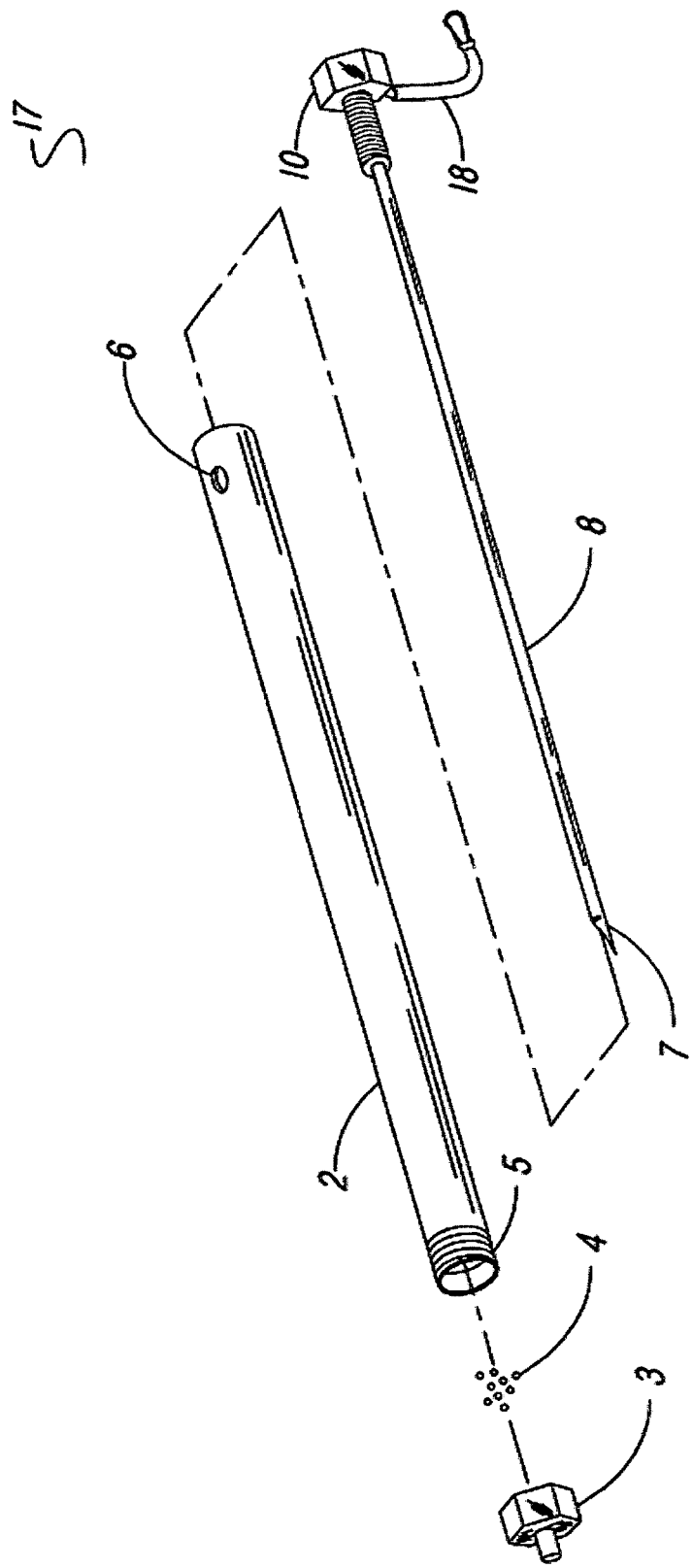
FIG. 7 is a perspective exploded view of another embodiment of the invention.
Figures 11, 12:
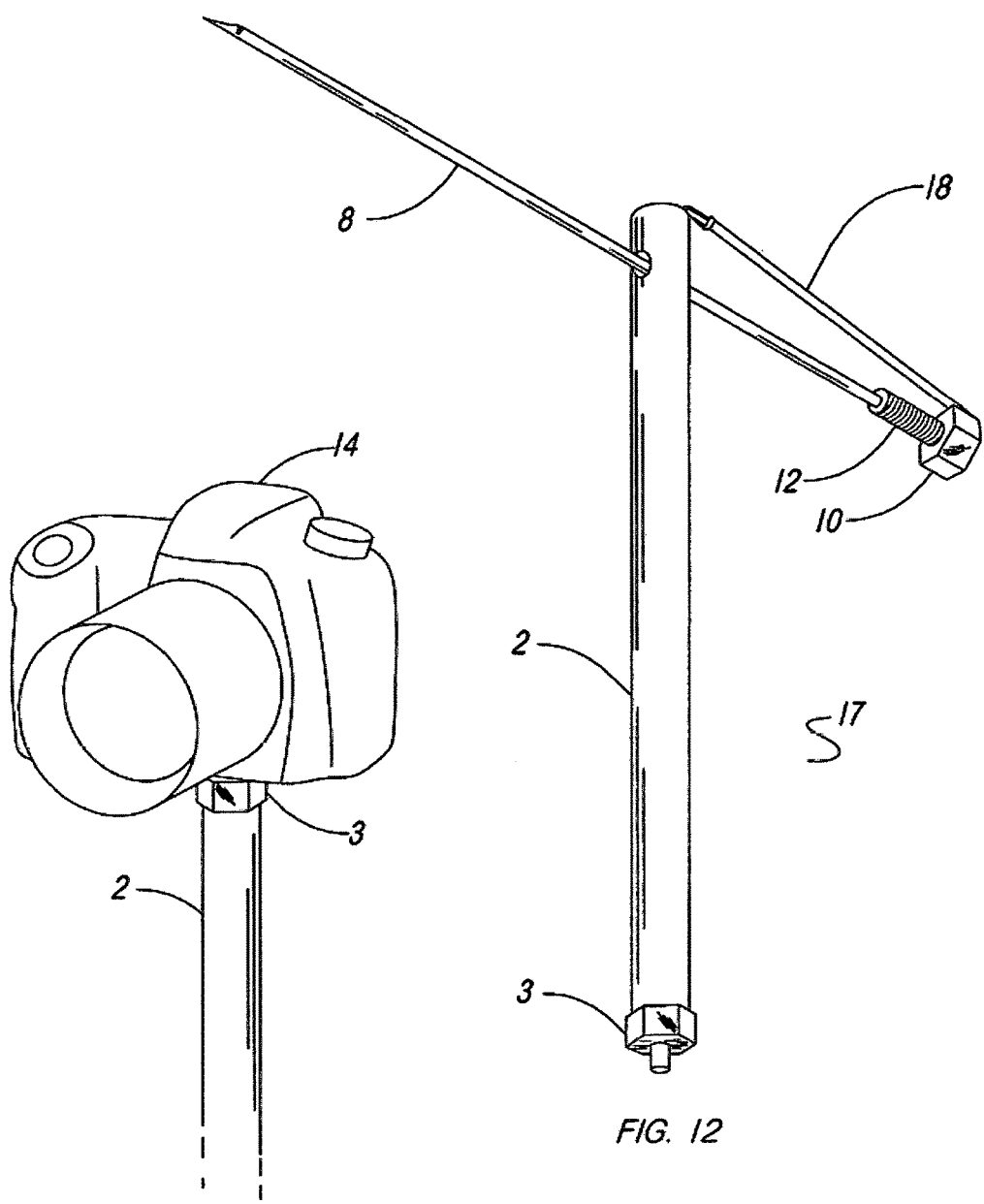
FIG. 11 is a perspective view of another embodiment having a camera affixed to the main tube.
FIG. 12 is a perspective view of another embodiment of the invention having the spear in firing position.

FIG. 5 illustrating an embodiment of the current invention 1 showing a conventional underwater camera with hot shoe adapter being selectively affixed to main tube 2 by means of the threaded protrusion on cap 3 therein. Cap 3 also being of a hexagonal shape and comprised of a rigid material such as plastic and the like along with a threaded protrusion matching standard camera mounting orifice threads thereon.

FIG. 6 illustrating an embodiment of the current invention 1 showing spear 8 disposed between aperture 6 perpendicular to the longitudinal axis of main tube 2.

FIGS. 7-12 illustrating another embodiment of the current invention 17 being identical to said FIGS. 1-6 with the exception of sling 18 having a carabiner hook fastener on a distal end.

It is additionally noted and anticipated that although the device is shown in its most simple form, various components and aspects of the device may be differently shaped or slightly modified when forming the invention herein. As such those skilled in the art will appreciate the descriptions and depictions set forth in this disclosure or merely meant to portray examples of preferred modes within the overall scope and intent of the invention, and are not to be considered limiting in any manner. While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention.

What is claimed is:

1. A spear fishing sling spear having multiple functions comprising:
    a rigid cylinder formed in a first part and a removable second part;
    the first part having an internal chamber defining a longitudinal axis and an aperture through the cylinder perpendicular to the longitudinal axis;
    the second part having a rigid spear that, in a first configuration, is removably stored in the internal chamber of the first part of the cylinder and, in a second configuration, is slidably affixed to the first part of the cylinder by passing the spear through the aperture with an elastic rubber cord connecting the spear to an end of the cylinder;
    the first and second parts of the cylinder having plastic caps to selectively connect the spear to the cylinder;
    wherein one distal end of the cylinder includes a carabiner hook fastener;
    and a second end of the cylinder includes a threaded cap configured to interchangeably receive an end of said spear and a camera.

2. The spear fishing sling spear of claim 1 providing a means of separating the cylinder in two parts with the first part having a larger diameter than the second part and allowing said first part to receive the second part having a smaller diameter.

3. The spear fishing sling spear of claim 1 providing a screw mount affixed to one end of the cylinder having a threaded cap allowing a camera to be selectively affixed thereon.

4. The spear fishing sling spear of claim 3 providing said screw mount affixed to one end of the cylinder having a threaded cap allowing an end of said spear to be selectively affixed thereon.

5. The spear fishing sling spear of claim 1 providing a permanently-affixed sounding device comprised of balls permanently sealed inside an internal chamber on a distal end of the cylinder.

\* \* \* \* \*